(12) United States Patent
Inui et al.

(10) Patent No.: US 6,971,758 B2
(45) Date of Patent: Dec. 6, 2005

(54) ILLUMINATION DEVICE

(75) Inventors: Shuji Inui, Nishikasugai-gun (JP); Moriyuki Hashimoto, Nishikasugai-gun (JP); Osamu Yamanaka, Nishikasugai-gun (JP); Yoshio Sano, Nishikasugai-gun (JP); Mitsuhiro Nawashiro, Nishikasugai-gun (JP); Hiroshi Ito, Nishikasugai-gun (JP); Akihiro Misawa, Nishikasugai-gun (JP); Takayuki Kamiya, Nishikasugai-gun (JP)

(73) Assignee: Toyoda Gosei Co., Ltd., Aichi (JP)

( * ) Notice: Subject to any disclaimer, the term of this patent is extended or adjusted under 35 U.S.C. 154(b) by 235 days.

(21) Appl. No.: 10/097,377

(22) Filed: Mar. 15, 2002

(65) Prior Publication Data

US 2002/0131261 A1 Sep. 19, 2002

(30) Foreign Application Priority Data

Mar. 16, 2001 (JP) ..................................... P.2001-076902
Mar. 26, 2001 (JP) ..................................... P.2001-087696

(51) Int. Cl.[7] ................................................. F21V 7/04
(52) U.S. Cl. .............................. 362/31; 362/23; 362/26; 362/27; 362/559; 362/565; 362/566; 362/812; 362/546; 362/547; 40/546; 40/547
(58) Field of Search .............................. 362/31, 23, 26, 362/27, 559, 812, 546, 547, 565, 566; 40/546, 547

(56) References Cited

U.S. PATENT DOCUMENTS

| | | | | |
|---|---|---|---|---|
| 3,491,245 A | * | 1/1970 | Hardesty | 250/227.11 |
| 4,965,950 A | * | 10/1990 | Yamada | 40/546 |
| 6,002,079 A | * | 12/1999 | Shin et al. | 84/464 R |
| 6,471,388 B1 | * | 10/2002 | Marsh | 362/559 |

* cited by examiner

*Primary Examiner*—Sandra O'Shea
*Assistant Examiner*—Bertrand Zeade
(74) *Attorney, Agent, or Firm*—McGinn & Gibb, PLLC

(57) ABSTRACT

In the illumination device of the invention, an LED is oppose to a side surface of a flat light guide member. A light shield surface for shielding light from the LED and emitted toward the backside of the guide member in vicinity of the LED on the backside of the light guide member.

27 Claims, 22 Drawing Sheets

ILLUMINATION DEVICE

CROSS REFERENCE TO RELATED APPLICATIONS

The present invention is based on Japanese Patent Applications No. 2001-76902 and No. 2001-87696, the entire contents of which are incorporated herein by reference.

BACKGROUND OF THE INVENTION

1. Field of the Invention

The present invention relates to an illumination device that radiates light from a light emitting diode (LED) via a light guide member. The illumination device according to the invention can be utilized for a display plate for a vehicle such as a scuff plate and a display plate for dwelling such as a nameplate.

2. Description of Related Art

For an illumination device for an automobile, a scuff plate illumination device 200 having a configuration shown in FIG. 19 is known. FIG. 19 is a longitudinal sectional view showing the scuff plate illumination device 200. The scuff plate illumination device 200 is provided with a flat light guide member 210, the LEDs 220 arranged opposite to the side 211 of the light guide member 210 and a cover 230. In such a scuff plate illumination device 200, light emitted from the LEDs 220 is incident on the light guide member 210 from the side 211 of the light guide member 210 and is radiated from a design surface 212. In case a character plate having a light transmission window of a desired shape is arranged on the design surface 212, a part of light radiated from the design surface 212 can be radiated outside via the light transmission window of the character plate and hereby, the desired shape can be displayed by the light from the LEDs 220.

When a state of the radiation of light in the above illumination device was examined, it was observed that light of high luminance was radiated from a part in the vicinity of the LED of the design surface and as a result, remarkable difference in luminance was made between light radiated from design surface in the vicinity of the LEDs and light radiated from the design surface in a position apart from the LEDs. That is, the radiation of light was not uniform throughout the design surface. By covering a part of the design surface in the vicinity of the LEDs, from which light of high luminance is radiated with a cover that transmits no light, radiation of light from this part is shielded and the luminance can be also unified. However, in such configuration, the area of the design surface is reduced and the illumination effect is reduced.

Similarly, for another illumination device, a scuff plate illumination device 300 shown in FIGS. 20A and 20B is known. The scuff plate illumination device 300 is installed in the interior of an automobile for displaying a character or the like. FIG. 20A is a plan view showing the scuff plate illumination device 300 viewed from the side of an emission surface 312. FIG. 20B is a sectional view along a line V—V in FIG. 20A. The scuff plate illumination device 300 is provided with a light guide member 310 and an LED 320 oriented to the side 311 of the light guide member 310. A plurality of grooves 315 are provided on the backside 313 of the light guide member 310 so that the bottom 316 (a display part) has a desired shape. In such the scuff plate illumination device 300, light emitted from the LED 320 is incident on the side 311 of the light guide member 310 and the light is reflected on the backside 313 of the light guide member 310 and observed from the emission surface 312. A state of the reflection or light is differentiated between the bottom 316 of the grooves, that is, the display part and a part except the groove of the backside 313 of the light guide member by providing the grooves 315 on the backside 313 of the light guide member 310, and hereby, a desired shape and a character are displayed. As light converges and is scattered at the edge of the groove 315, the edge emits light of high luminance and the contour of the display part 316 is highlighted.

In the illumination device 300, however, the display part 316 close to the LED 320 was displayed at high luminance and the luminance of the display part 316 distant from the LED 320 was weak. That is, the whole display part 316 could not be displayed at uniform luminance. Although a larger a light guide member with a larger emission surface is desired from a viewpoint of enhancing the design of the illumination device, a large emission surface is adopted to a illumination device with the above configuration, nonuniformity in luminance becomes remarkable and such a demand cannot be satisfied. Even if another LED is merely provided on the opposite side of the light guide member where luminance decreases for the uniform luminance of the display part, the display part close to the LED is displayed at higher luminance and the luminance of the display part distant from the LEDs, namely, the display part in the middle of the light guide member, the luminance becomes weak. The problem of the nonuniformity of luminance remains unsolved after all.

SUMMARY OF THE INVENTION

The invention is made in view of the problems and the object is to provide an illumination device in which a desired shape and a character can be displayed with uniform emission throughout an emission surface as well as with high illumination effect.

The inventors studied on the problems and clarified that radiation of light with high luminance from the design surface located in the vicinity of LED is caused by light which is reflected on the backside of the light guide member among all the light emitted from LED. Then, they conceived that if light reflected on the backside of the light guide member was shielded, the luminance of radiated light could be unified throughout the design surface. The invention is based upon such the studies and configured as: an illumination device comprising: a light source such as LED; a light guide member which receives a light from the light source on a first surface thereof opposing to the light source and radiates the light from a design surface provided on a second surface thereof; and a light shield surface formed in the vicinity of the light source for shielding a light which is emitted toward a backside of the light guide member.

In the illumination device configured as described above, light emitted from the light source (or LED) toward the backside of the light guide member in the vicinity of the light source is shielded by the light shield surface. As a result, the light is prevented from being reflected and being radiated from the upper design surface and the radiation of light of high luminance in the vicinity of the light source is prevented. Hereby, further uniform radiation is acquired throughout the design surface. As described above, according to the configuration according to the invention, radiation from the whole design surface is unified without reducing the design surface unnecessarily. That is, the high illumination effect is acquired in the illumination device provided by the invention and further uniform light can be radiated throughout the design surface.

As another aspect of the invention, there is provided an illumination device comprising: a light source; a light guide member having a first surface opposing to the light source and a second surface for emitting light; and a plurality of display parts formed on bottoms of grooves provided on the backside; wherein the display parts are provided such that a position of the display parts becomes closer to the second surface, as a distance of display parts from the light guide becomes larger.

In such configuration, after light incident on the light guide member from the light source is reflected on the backside of the light guide member, it is radiated from the upper surface of the light guide member, that is, the emission surface, however, as the grooves are formed on the backside of the light guide member, a state of reflection at the bottom of each groove and a state of reflection on the other part of the backside of the light guide member are different and hereby, a shape of the bottom is displayed. That is, the bottom of the groove provided to the backside of the light guide member functions as a display part and if the display part is formed so that it has a desired shape, the desired shape can be displayed. As the display part formed more distantly from the light source is formed closer to the upper surface of the light guide member, distance after reflection between light reflected on the display part formed more distantly from the light source and the emission surface is shorter and the light is radiated at higher efficiency from the emission surface. Hereby, even if the light volume received by the display part which is more distant from the light source is smaller, the radiant efficiency of light is contrarily enhanced. Even the display part formed distantly from the light source can receive incident light parallel to the light source at the edge on the side of the light source. Therefore, difference in luminance between light reflected on each display part and radiated outside is reduced. That is, the luminance of each display part is unified and all the display parts can be displayed by emission more uniform.

DETAILED DESCRIPTION OF THE PREFERRED EMBODIMENTS

Each member of the invention will be described below.

Although the type of a light source is not particularly limited, various types of LEDs such as a round type and a chip type can be adopted. As LED is small-sized, the whole light emitting device is miniaturized by using it. LED also has advantages such that only small driving power is required and power consumption is lower, as well as that the life is long. Further, as the calorific value is small, a thermal effect upon members around LED is small.

The luminescent color of the adopted LED is not particularly limited. A plurality of LEDs which have different luminescent color may be also combined. In case plural LEDs are used, the luminescence of each LED is controlled and light according to various luminescence can be emitted. For example, if red, green and blue light emitting diodes are used and a state and the quantity of tho luminescence of each LED are controlled, desired light can be omitted. The number of used LEDs is determined in consideration of the size of a light guide member described later (particularly the size of an upper design surface of a light guide member) and required luminance.

The LED is arranged opposite to the side of a light guide member described later and light in transmitted from the side into the inside of the light guide member. It is desirable that LED is arranged so that the optical axis of the LED is substantially parallel to the upper design surface of the light guide member. Hereby, the luminance of light radiated from a part close to the LED of the upper design surface and light radiated from a distant part can be unified. Therefore, in case an upper design surface having large area is adopted, light can be emitted at further uniform luminance throughout the upper design surface.

A light guide member radiates light incident on the side from the LED from the upper design surface. The upper design surface means a light emitting surface of the light guide member from which light is radiated. The shape of the upper design surface is designed according to a way of the radiation or light. For example, the upper design surface is formed by a plane to obtain a surface emission. A part or, the entire of the upper design surface can be also formed by a curved surface. Hard coating may be also applied to the upper surface of the light guide member to prevent the upper surface from being damaged or contaminated.

The material of the light guide member is not particularly limited if only the light guide member transmits light. It is desirable that the light guide member is formed by transparent material. It is also desirable that the light guide member is formed by material with easy processing and excellent durability. For the material of the light guide member, for example, polycarbonate resin, acrylate resin, epoxy resin and glass can be used.

Figure 1A:
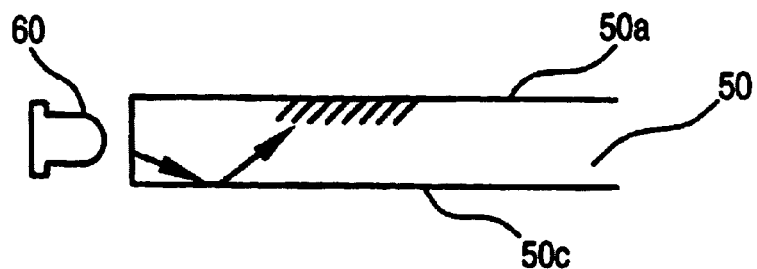
FIGS. 1A to 1D are explanatory drawings for explaining embodiments of a light shield surface formed in a light guide member.
Figure 1B:
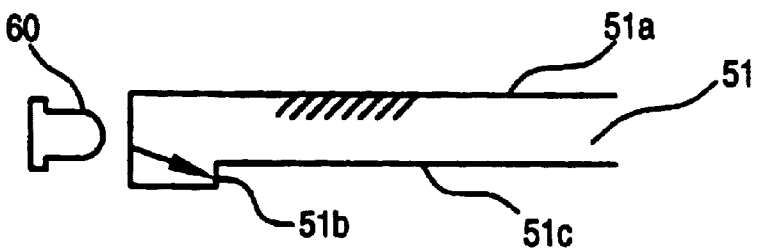
Figure 1C:
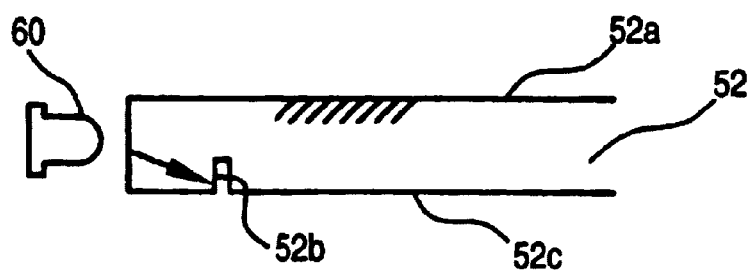
Figure 1D:
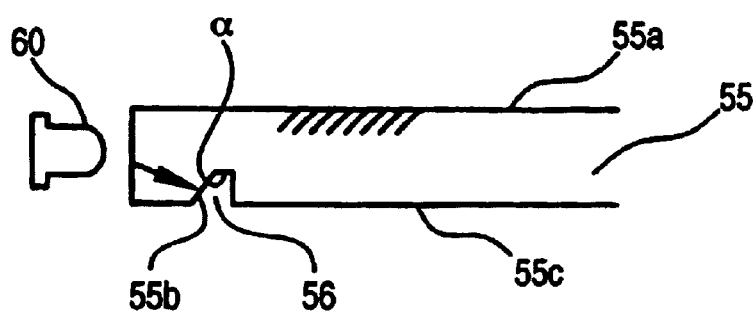

A light shield surface is formed inside the light guide member, for shielding light entering from a surface opposing to the LED and emitted toward the backside of the light guide member. Referring to FIGS. 1A to 1D, the light shield surface will be described. As shown in FIGS. 1A to 1D, a reference number 60 denotes LED, and 50, 51 and 52 denote a plat-shape light guide member. FIG. 1A shows a case that no light shield surface is provided to the light guide member, light 61 emitted from the LED 60 toward the backside 50c of the light guide member in the vicinity of LED is reflected on the backside 50c and is radiated from the vicinity of LED (a part shown by a slant line) of the upper design surface 50a. FIGS. 1B to 1D show a case that a light shield surface is provided. A light shield surface of the invention is provided on a side surface of a recess formed on the backside of the light guide member. That is, in FIG. 1B, a light shield surface 51b for shielding light 61 is provided to the light guide member 51 and similarly, in FIG. 1C, a light shield surface 52b is provided to the light guide member 52. In the light guide member 51 shown in FIG. 1B, the backside 51c of the light guide member 51 is formed like a step in the vicinity of the LED 60 and the light shield surface 51b is formed. In the light guide member 52 shown in FIG. 1C, a groove is provided to the backside 52c of the light guide member in the vicinity of the LED 60, the light shield surface 52b is formed.

The light shield surface is not required to be perpendicular to the backside of the light guide member shown in FIGS. 1B and 1C and for example, may be also a face formed at such an angle that light from the LED enters perpendicularly into the light shield surface. The shape of the light shield surface is not limited to a flat face. It is desirable that the light shield surface has such a size that it shields light emitted toward the backside of the light guide member in the vicinity of the LED and does not shield light emitted in a direction of the optical axis of the LED. The reason is that in case a large light shield surface is provided redundantly and light emitted in the direction of the optical axis is also shielded, light radiated from the upper design surface decreases.

As shown in FIG. 1D, a light shield surface 55b is inclined, an angle α between the bottom of a groove 56 and the light shield surface 55b is larger than the right angle. In this case, the light shield surface 55b receives light more, as compared to the light shield surface 52b shown in FIG. 1C with the same depth of the groove. Thus the light shield area is increased without shielding light emitted in a direction of the optical axis from the LED.

Figure 2A:
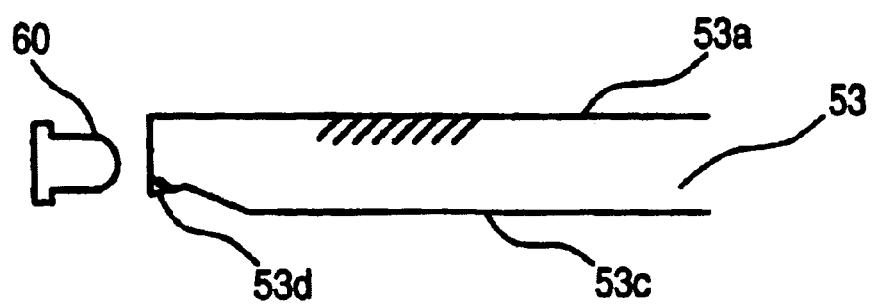
FIGS. 2A and 2B are explanatory drawings for explaining embodiments of the light shield surface similarly formed in the light guide member.
Figure 2B:
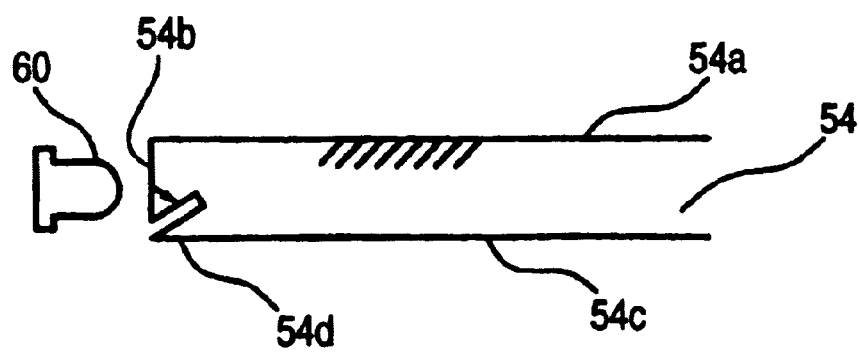

Further, a position where the light shield surface is formed is not limited to the backside of the light guide member and for example, as shown in FIG. 2A or 2B, a light shield surface 53b, 54b may be also formed on the side 53d, 54d opposite to the LED 60 of a light guide member 53, 54. Further, the light shield surface can be formed by material that shields light. For example, an aluminum plate is inserted in a position of the light shield surface.

The generation of reflected light on the backside in the vicinity of the LED of the light guide member shown in FIG. 1A is prevented by adopting the light shield surfaces, however, to enhance the shielding effect, it is desirable that a colored tape is stuck or colored ink and paint are printed, applied or coated respectively on the surface of the light shield surface. Particularly, in case black paint is used, a light shield surface having the extremely high shielding effect is acquired.

A light diffusion process may be also applied to the surface of a light shield surface so that light is diffused on the surface.

It is desirable that the circumferential portion of the upper design surface on the side of the LED is covered with a member for shielding light. That is, it is desirable that no light is radiated from the surface of the circumferential portion. On the circumferential portion, a part of light emitted from the LED is directly radiated and as a result, light of high luminance is radiated from the surface of the circumferential portion, compared with light from another part. The reason why the circumferential portion is covered is to shield light of high luminance so that the luminance of the whole upper design surface is unified. The circumferential portion on the side of the LED of the upper design surface means a circumferential portion adjacent to the side of the light guide member to which the LED is opposite out of the upper design surface.

A light guide member having a groove for housing the LED and the wiring of the LED may be also adopted. As the LED can be housed in the light guide member as described above, equipment for housing the LED is not required to be provided separately and the number of parts can be reduced. As an LED and a light guide member are integrated, sealing performance is enhanced and an illumination device having high dustproof and waterproof effect can be formed. For example, a groove can be provided to the side of the upper design surface substantially along the peripheral wall of the light guide member.

It is desirable that a light reflecting layer is provided to the backside of a light guide member. Light incident on the light guide member converges on the light reflecting layer by providing the light reflecting layer and can be reflected in a direction of the upper design surface. The light reflecting layer can be formed by printing, deposition or sputtering using ink having reflectivity (for example, white ink). The light reflecting layer can be also formed by sticking a white tape. It is desirable that for ink and a tape, ink having high reflectivity and a white tape having high reflectivity are used. Further, a light reflecting layer can be also formed by roughing the backside of a light guide member by etching, sand blasting or electrical discharge machining.

A thin metal layer (for example, a gold layer) can be provided to the upper surface of the light guide member. Hereby, the color or light radiated from the upper surface can be converted. The metal layer can be formed by a well-known method such as deposition and sputtering. In plate of the metal layer, a layer for converting the color of light radiated from the upper design surface can be also provided by sticking a film of desired color, applying ink or coating material of desired color or coating.

A half mirror layer can be also provided to the upper design surface. The color of light observed on the upper design surface can be differentiated between a state in which the outside is light and a state in which the outside is dark by providing the half mirror layer. The half mirror layer can be provided by sequentially laminating a metal layer, a protective layer and an ink layer on the upper design surface for example. To show all example of such a half mirror layer forming method, first, Al is deposited on the upper design surface to form a metal layer made of an Al thin film. The metal layer is formed so that it has such thickness that half mirror effect is acquired. For example, the metal layer can be formed so that it has such thickness that the transmittance of light is approximately 15 to 20%. Next, transparent resin such as epoxy resin to be a protective layer is laminated on the metal layer by printing or application. Finally, ink such as yellow ink is printed or applied to form an ink layer. Needless to say, a method of forming a half mirror layer is not limited to this and the material of the metal layer and the protective layer, the material and the color of the ink layer can be arbitrarily selected. The half mirror layer can be also provided to the backside of the light guide member or the backside of a light transparent sheet described later.

A layer including fluorescent material can be also formed on the upper design surface of the backside of the light guide member. As described above, the wavelength of a part of light from the LED can be converted by the fluorescent material and the color of light radiated from the upper design surface can be converted. In case the half mirror layer is formed as described above, fluorescent material may be also included in the ink layer forming a part of the half mirror layer.

A character plate having a light transmission window having a desired shape is arranged in a direction of the radiation of light from the upper design surface of the light guide member and the desired shape can be displayed by light radiated from the upper design surface. The character plate can be produced by providing a light transmission window on a member which does not transmit light. For example, a thin plate made of any of various metal or alloys is prepared and a light transmission window having a desired shape is provided by removing a part by etching or press working. For material that transmits no light, opaque resin and opaque plastic can be also used. In case the character plate is produced by using the material that transmits no light as described above, the light transmission window can be filled with transparent resin such as polyvinyl chloride and epoxy resin. In the meantime, the character plate can be also formed by material that transmits light. For example, a thin plate made of acrylate resin is prepared and ink that transmits no light is printed on the surface so that a desired shape is left like an island. As described above, a character plate where only the desired shape can transmit light is formed. A layer made of metal or an alloy is provided on the surface of a character plate is provided and the design may be also varied.

Light is radiated from only a desired shape and the desired shape can be also displayed by forming a layer that transmits no light except the desired shape on the upper design surface of a light guide member without using a character plate. Such a layer that transmits no light can be formed by printing, applying or coating black ink for example.

A light transparent sheet which covers the upper design surface of the light guide member and the circumferential portion of which is bonded to the light guide member can be used. In case the character plate is used, the light transparent sheet is used on the character plate so that the light transparent sheet covers the side from which light is radiated.

For the material of the light transparent sheet, polycarbonate resin, acrylate resin and epoxy resin can be used. It is desirable that hard coating is applied to the upper surface of the light transparent sheet to prevent damage and contamination. The damage and contamination of the upper design surface of the light guide member can be prevented by using the light transparent sheet.

The light transparent sheet and the light guide member can be bonded by using an adhesive or sealant. The light transparent sheet and the light guide member are formed by the same material (for example, polycarbonate resin) and both can be also bonded by welding the light transparent sheet and the light guide member. For a welding method, a well-known method can be adopted.

The invention will be described further in detail using a scuff plate illumination device 1 equivalent to one embodiment of the invention as an example below. The scuff plate illumination device 1 is attached to a side step of an automobile and used, and displays a desired shape by light from the LED.

Figure 3:
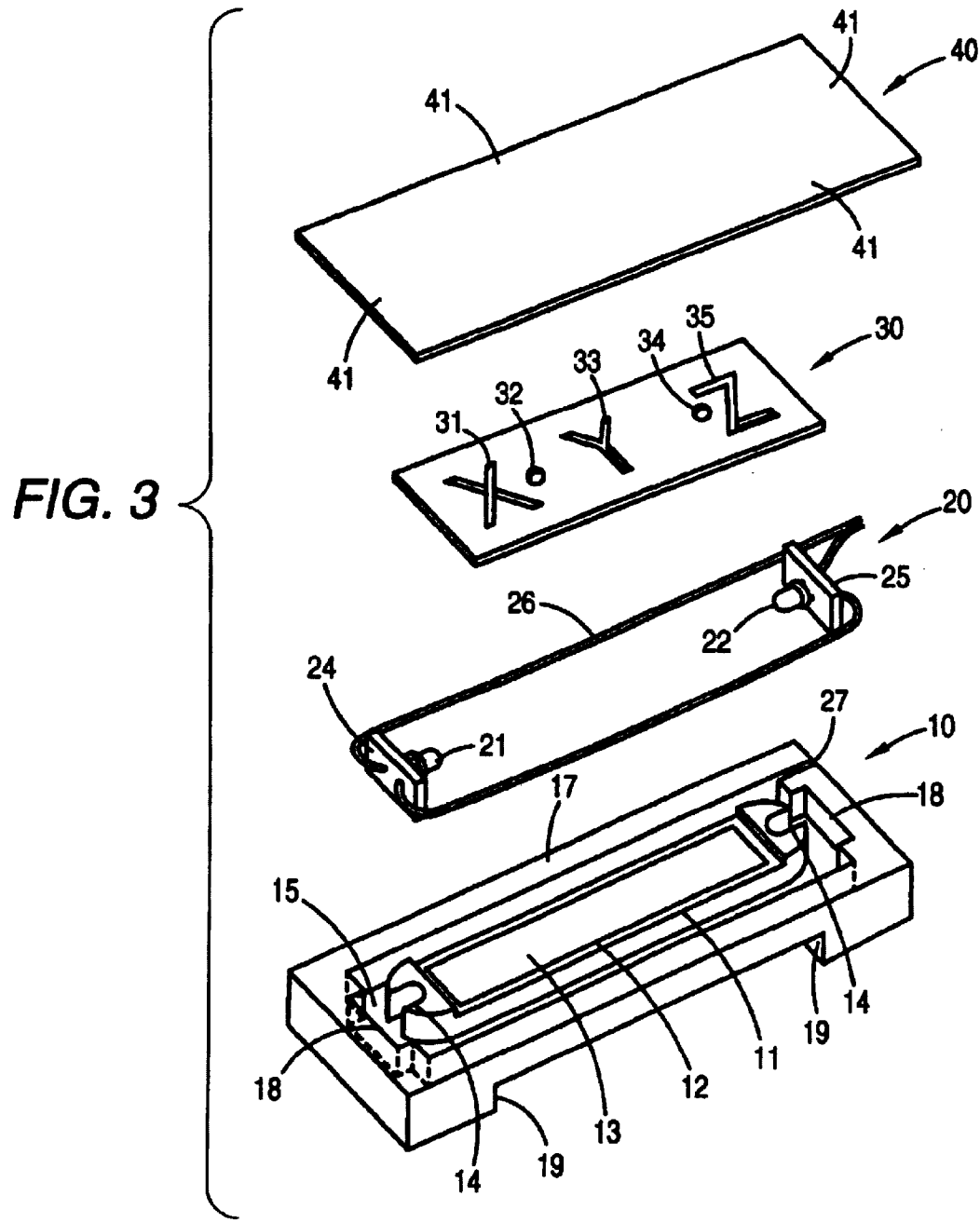
FIG. 3 is a perspective view showing a state before the assembly of a scuff plate illumination device 1 equivalent to one embodiment of the invention.
Figure 4:
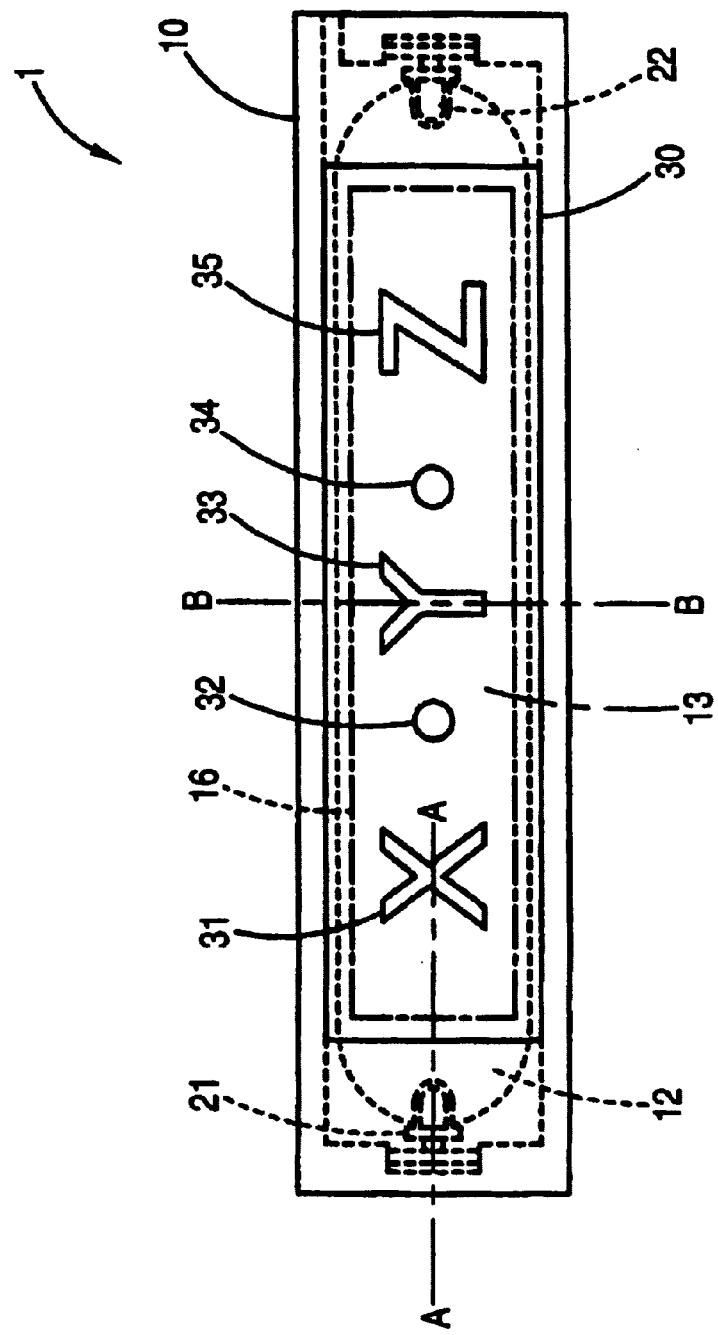
FIG. 4 is a plan view showing the scuff plate illumination device 1 in an assembled state viewed from the side of an emission observation surface.
Figure 5:
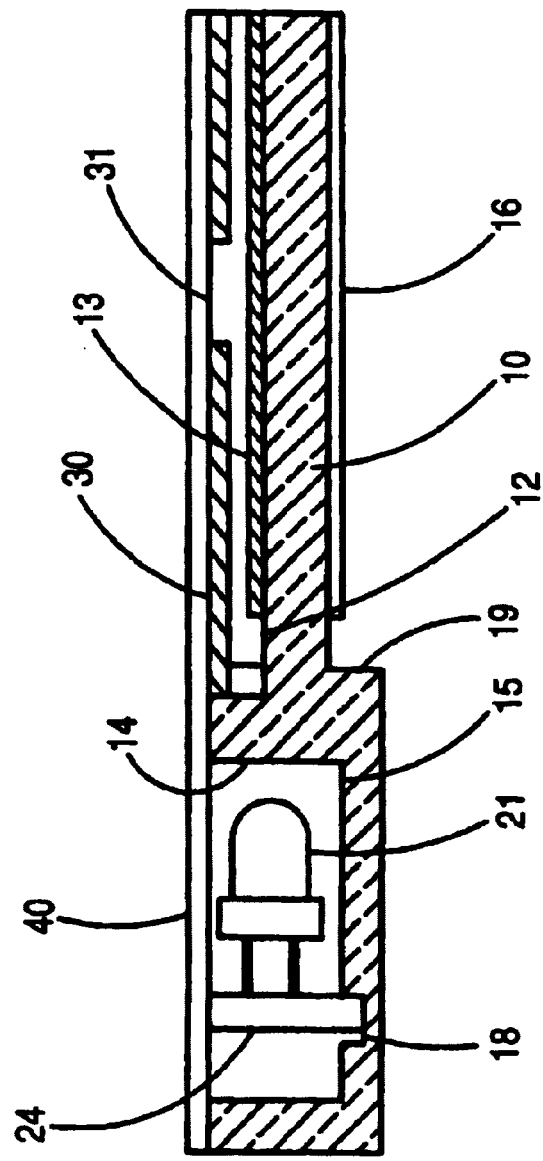
FIG. 5 is a sectional view viewed along a line A—A in FIG. 4.
Figure 6:
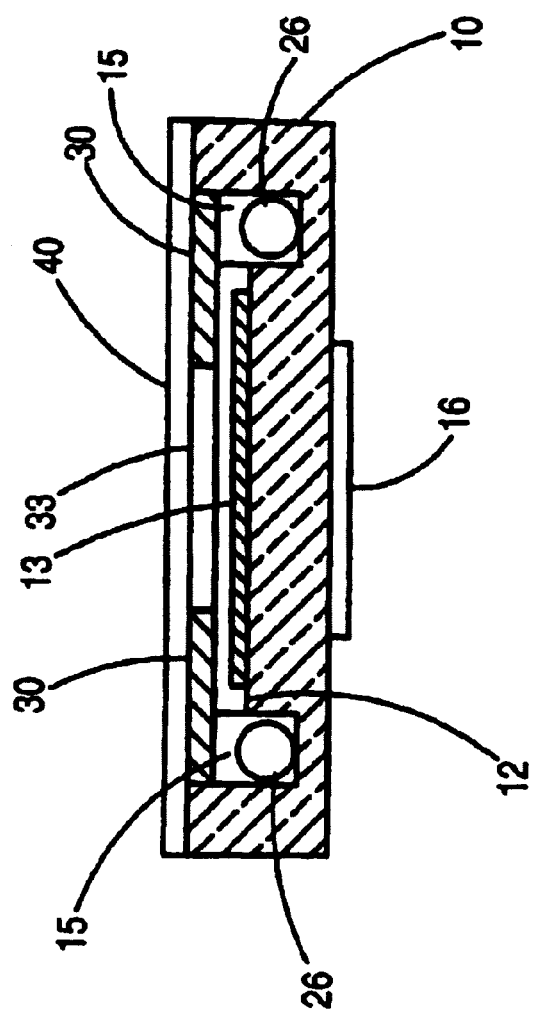
FIG. 6 is a sectional view viewed along a line B—B in FIG. 4.

FIG. 3 is a perspective view showing a state before the scuff plate illumination device 1 is assembled. FIG. 4 is a plan view when the scuff plate illumination device 1 after assembly is viewed from the side of an emission observation surface. FIGS. 5 and 6 are respectively a sectional view viewed along a line A—A in FIG. 4 and a sectional view viewed along a line B—B in FIG. 4. Referring to each drawing, the configuration of the scuff plate illumination device 1 will be described below.

As shown in FIG. 3, the scuff plate illumination device 1 is substantially composed of a light guide member 10, a light source unit 20, a character plate 30 and a light transparent sheet 40.

The light guide member 10 is made of polycarbonate resin. A groove 15 is provided to one surface of the light guide member 10 substantially along the peripheral wall and hereby, a frame-shaped peripheral part 17 and an insular light transmission part 11 are formed. The surface of the center of the light transmission part 11 forms an upper design surface 12. A light introduction part 14 is formed at both ends of the light transmission part 11. The upper design surface 12 is formed in a position lower than the peripheral part 17 (a lower position FIG. 3). A metal layer 13 made of gold foil is formed on the upper design surface 12. Such a metal layer 13 is formed by hot stamping.

A depression 18 is formed toward the outside at both side ends of the groove 15 and substrates 24 and 25 of the light source unit 20 described later are housed here.

The surface (reverse to the emission observation surface, hereinafter called the backside of the light guide member 10) reverse to the side on which the groove is formed of the light guide member is formed in a form lower than the upper design surface by a step at both ends of the light guide member and a light shield surface 19 is formed (see FIGS. 3 and 5). In this embodiment, the light guide member 10 or the shape described above is produced by injection molding. A black tape is stuck on the surface of the light shield surface.

A light reflecting layer 16 is formed on a part of the backside of the light guide member 10 (see FIGS. 4, 5 and 6). The light reflecting layer 16 is provided to converge light from LEDs 21 and 22 and reflect it in the direction of the radiation of light. In this embodiment, the light reflecting layer 16 is formed by printing white color. The light reflecting layer 16 is formed so as to include at least a region in which characters 31 to 35 on the character plate 30 are orthographically projected on the backside of the light guide member 10 in a state in which the character plate 30 is arranged. In this embodiment, the light reflecting layer 16 having the substantially similar shape to the character plate is formed in a region slightly smaller than the region in which the character plate 30 is orthographically projected on the backside of the light guide member 10. Area in which light from the LEDs 21 and 22 converges is reduced by reducing the region in which the light reflecting layer 16 is formed as described above, as a result, the whole light reflecting layer 16 can converge light evenly and can reflect light having uniform luminous energy.

The area of the light reflecting layer 16 can be also further reduced and for example, the light reflecting layer 16 can be also formed so as to cover a region slightly larger than the region in which the characters 31 to 35 on the character plate 30 are orthographically projected on the backside of the light guide member 10 in a state in which the character plate 30 is arranged. That is, the light reflecting layer 16 can be also provided so that it at least covers a region of the backside of the light guide member 10 viewed via the characters 31 to 35 of the character plate 30 when the scuff plate illumination device 1 is viewed from the front face from the side of the emission observation surface. Further, the light reflecting layer 16 covering a region slightly larger than the region in which the characters 31 to 35 of the character plate 30 are orthographically projected on the backside of the light guide member 10 and having the substantially similar shape to the character plate can be also provided. Hereby, the light reflecting layer 16 is also provided in a part on the backside of the light guide member 10 viewed via the characters 31 to 35 of the character plate 30 even if the scuff plate illumination device 1 is viewed from a diagonal direction and a state of radiation from the characters 31 to 35 can be prevented from varying depending upon a viewed angle. A light reflecting layer corresponding to the shape of the characters 31 to 35 can be also provided in place of providing the light reflecting layer in the similar shape to that of the characters 31 to 35. For example, in this embodiment, a square, triangular or circular light reflecting layer can be provided so as to cover a region in which each character is orthographically projected on the backside of the light guide member 10.

The light source unit 20 is composed of the LEDs 21 and 22, substrate 24 and 25 on each of which each LED is mounted and wiring 26 for supplying power to each LED.

For the LEDs 21, 22, round type LED having the luminescent color of umber is used. The light source unit 20 is connected to a power source and a control circuit respectively not shown and the lit state of the LEDs 21 22 is controlled according to the opening or closing of a door.

The character plate 30 is a member made of aluminum having the characters 31 to 35 and functions as a mask member for shielding a part of light radiated from the upper design surface 12 of the light guide member 10 and radiating light outside from only the characters 31 to 35. In this embodiment, the characters 31 to 35 are formed by etching the aluminum thin plate.

The character plate 30 is mounted so as to cover the upper design surface 12 of the light guide member 10 after the light source unit 20 is built in the light guide member 10. At this time, it is desirable that the character plate 30 is fixed on the upper design surface 12 using an adhesive or a tape and in this embodiment, the character plate 30 is fixed using a transparent double coated tape.

The light transparent sheet 40 is a sheet made of polycarbonate and after the light source unit 20 and the character plate 30 are built in the light guide member 10, the light transparent sheet is coated so that it covers the side of an emission observation surface of the character plate 30. Hard coating is applied to the upper surface of the light transparent sheet 40.

The circumferential portion 41 of the light transparent sheet 40 is bonded to the light guide member 10. In this embodiment, each shape viewed from the top of the light transparent sheet 40 and the light guide member 10 is substantially the same and the circumferential portion 41 of the light transparent sheet 40 is bonded to the peripheral part 17 of the light guide member 10. Hereby, dust and water can be prevented from entering the light guide member 10 from the side of the emission observation surface. As a result, the upper design surface 12 of the light guide member 10 can be prevented possibly from being damaged or being contaminated. The effect of dust and water upon the light source unit 20 can be also prevented possibly. The light transparent sheet 40 and the light guide member 10 are bonded with each other by welding. First, after multitude of projections are formed on the upper surface of the peripheral part 17 or the light guide member 10 made of polycarbonate and the light transparent sheet 40 is laid on the upper surface, horizontal or vertical high-frequency oscillation is applied. Hereby, projections formed on the peripheral part 17 of the light guide member 10 are melted and as a result, the light transparent sheet 40 and the light guide member 10 are welded.

A wiring slit 27 of the light guide member 10 is filled with sealant for waterproof and dustproof after wiring.

Figure 7:
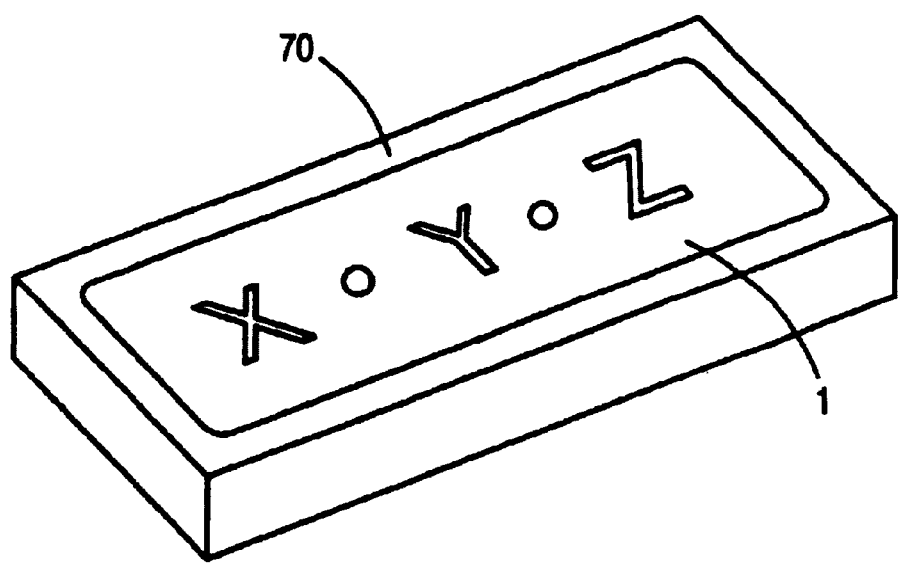
FIG. 7 is a perspective view showing the scuff plate illumination device on which a cover 7 is installed.

The scuff plate illumination device 1 configured as described above can be covered with a cover 70 made of metal such as stainless steel SUS as shown in FIG. 7. The scuff plate illumination device 1 can be protected from outside impact by using the cover 70. The surface from which light is radiated (the surface of the light transparent sheet) can be prevented from being damaged. Further, as each vicinity of the LEDs 21 and 22 is covered and shielded by the cover 70, the radiation of light of high luminance through the vicinity is prevented, that is, the unevenness of emission is reduced.

Next, referring to FIG. 5, a state of the radiation of light in the scuff plate illumination device 1 will be described. For the convenience of explanation, a state in which light emitted from the LED 21 is radiated from the character 31 of the character plate 30 will be described as an example. First, light emitted from the LED 21 in a direction of the optical axis enters into the light guide member 10 from the light introduction part 14. After the light advances in the light guide member 10 and is converged by the light reflecting layer 16, it is reflected in the direction of the radiation of light (upward in FIG. 5). After the reflected light is radiated from the upper design surface 12 of the light guide member 10 and the color of the light is converted by the metal layer 13, it is radiated through the character 31 of the character plate 30. In the meantime, light emitted on the side of the backside of the light guide member 10 from the LED 21 is shielded by the light shield surface 19. Therefore, such light does not advance toward the upper design surface 12, is never radiated via the character 31 and as a result, the character 31 is never displayed at higher luminance, compared with another character 32 and others. Hereby, the illumination device the unevenness of emission of which is rare throughout the characters is acquired.

The example to which the invention is applied is described above using the scuff plate illumination device 1, however, the an illumination device according to the invention can be applied to another illumination device for the interior of an automobile (for example, a planar illumination device attached to a door and a linear illumination device attached to a pillar). The illumination device according to the invention is not limited to an illumination device for an automobile and can be also applied to an illumination device for a nameplate and others in various vehicles and an illumination device for a display plate inside dwelling or an illumination device for a display plate outside such as a nameplate.

The invention is not limited to the description of the embodiment of the invention. Various transformed embodiments in a range which does not deviate from the description of claims and which can be easily imagined by this manufacturer are also included in the invention.

Figure 8A:
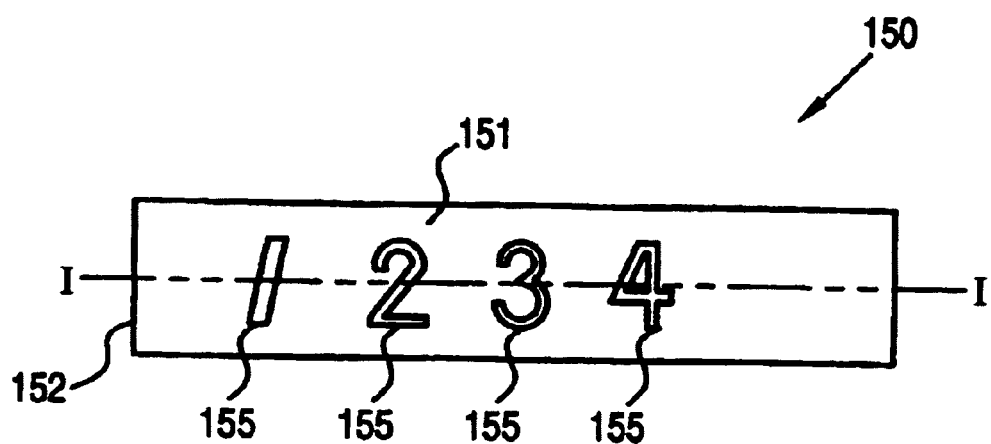
FIGS. 8A and 8B show a second embodiment of a light guide member according to the invention.
Figure 8B:
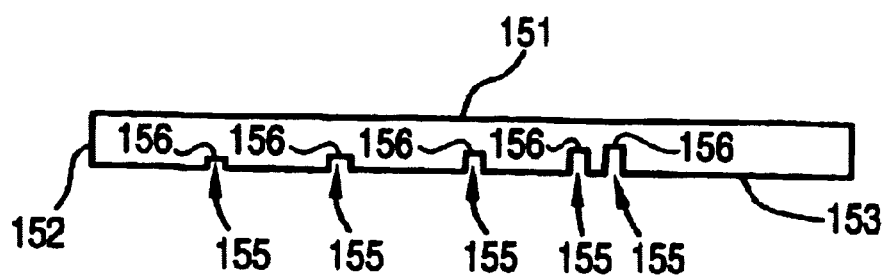

Next, another embodiment of the light guide member will be described below referring to the drawings. FIGS. 8A and 8B show an example of the light guide member, FIG. 8A is a plan view showing a light guide member 150 and FIG. 8B is a sectional view viewed along a line I—I in FIG. 8A. The light source is arranged opposite to the side 152 of the light guide member 150 in assembly. The same reference number in the following description denotes the same member (component).

Plural grooves 155 the bottom 156 of each of which is formed in a desired shape (a number in FIG. 8A) are formed on the backside 153 of the light guide member 150. In this example, each groove 155 is independently provided, however, a part or all the grooves 155 may be also provided continuously (in a connected state). The shape of the bottom (also called a display part in this specification) 156 of the groove is not particularly limited and is selected out of a desired character, a desired graphic form, a desired mark or a combination of these.

Figure 9:
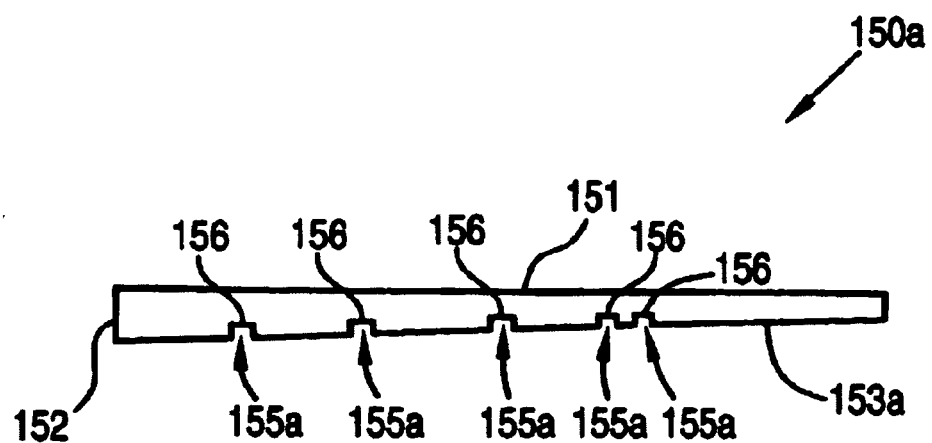
FIG. 9 shows the second embodiment of a light guide member according to the invention.

Each groove 155 is provided so that the bottom (the display part) 156 of the groove more distant from the side 152 arranged opposite to the light source is located closer to the upper surface 151. Distance (positional relation) between each bottom 156 and the upper surface 151 can be suitably adjusted in relation with a state of emission and it is desirable that a position in which each bottom is formed is adjusted so that emission of substantially similar luminance is acquired from all bottoms 156. In the example shown in FIGS. 8A and 8B, as the groove is formed distantly from the side 152, the depth of the groove 155 is gradually made deep, however, as shown in FIG. 9, the backside 153a is inclined so that as the backside is distant from the side 152a, it becomes closer to the upper surface 151a and grooves 155a each depth of which is fixed can be also provided. The degree of the inclination of the backside 153a in this case can be designed so that a desired emission is acquired. Specifically, it is desirable that the backside 153a is the backside having such inclination that uniform light volume, that is, emission without unevenness is acquired throughout the upper surface 151a.

Figure 10A:
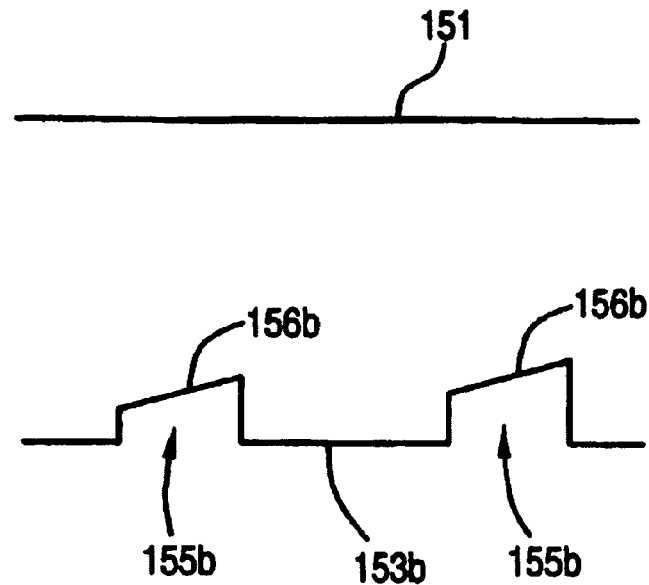
FIGS. 10A and 10B show the second embodiment of a groove formed on the respective backsides of light guide members.
Figure 10B:
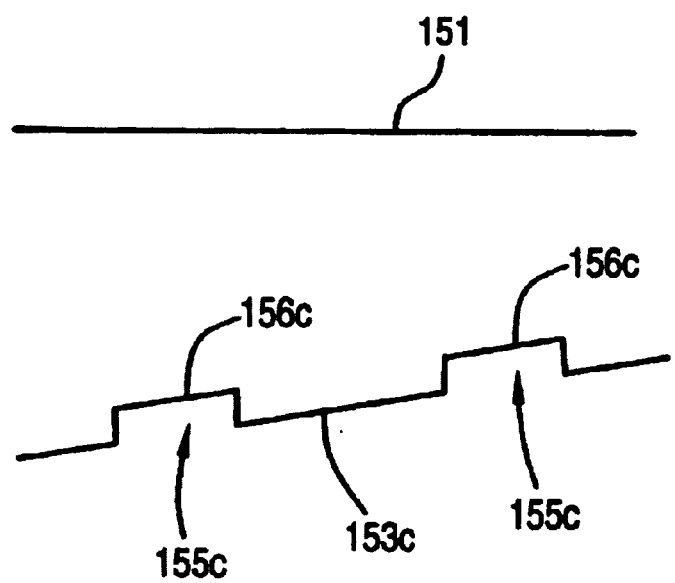

In the example shown in FIGS. 8A and 8B or FIG. 9, the bottom (the display part) of the groove is parallel to the upper surface of the light guide member, however, the display part can be also inclined. Specifically, as shown in FIGS. 10A and 10B, display parts 156b and 156c can be inclined so that they become closer to the upper surface 151 as they are formed more distantly from the side opposite to a light source of a light guide member. As a result, the unevenness of emission in a direction of an optical axis in each display part can be reduced. It is particularly effective in case the display part is long (large) in the direction of the optical axis to adopt the display part having inclination described above. FIG. 10A shows an example in which the display part is inclined in the light guide member 150 shown in FIGS. 8A and 8B and is an enlarged view showing a part of the light guide member. FIG. 10B shows an example in which the display part is similarly inclined in the light guide member 150a shown in FIG. 9. The degree of the inclination of the display part is suitably designed so that desired emission is acquired like the degree of the inclination of the backside of the light guide member.

Figure 11A:
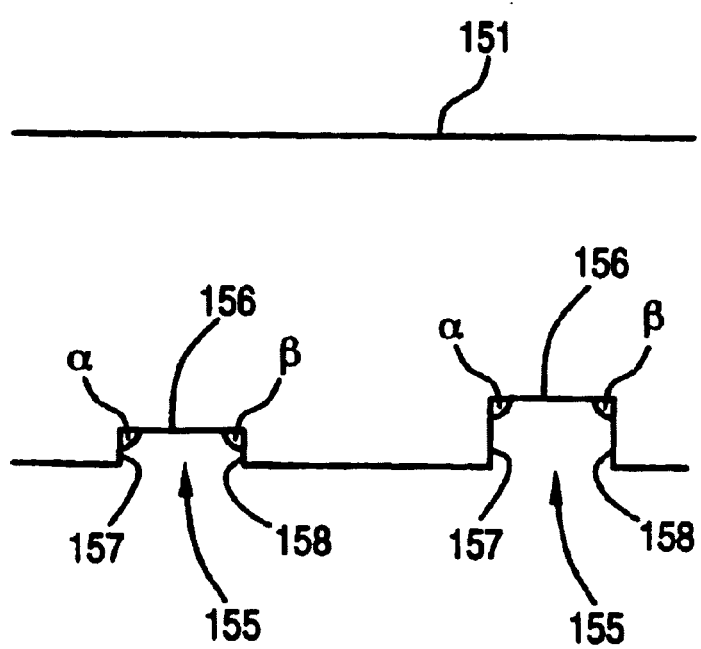
FIGS. 11A and 11B similarly show the second embodiment of a groove formed on the respective backsides of light guide members.
Figure 11B:
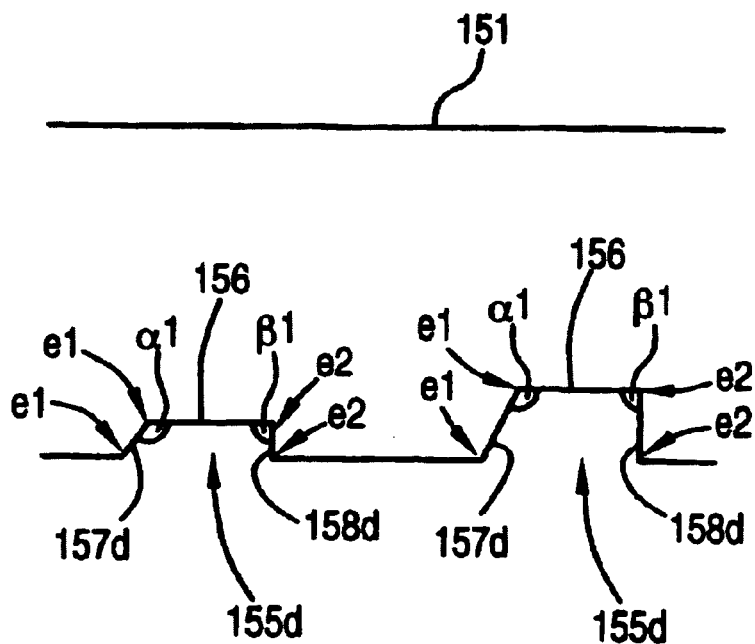

FIGS. 11A and 11B show examples of each state of the bottom and the side respectively forming a groove on the backside of a light guide member. In FIG. 11A, an angle α (a first angle) between the bottom 156 of a groove 155 and the side 157 (the first side) close to a light source and an angle β (a second angle) between the bottom 156 and the side 157 (the second side) distant from the light source are equal. In the meantime, in FIG. 11B, an angle α1 (a first angle) between the bottom 156 of a groove 155d and the side 157d (the first side) close to a light source is larger than an angle β1 (a second angle) between the bottom 156 and the side 58d (the second side) distant from the light source. In this case, though the side 157d receives more quantity of light, the scattering of light at the edge is inhibited because the side is inclined and an angle of an edge e1 is gentle. As a result, difference in the quantity of scattered and emitted light between edges e1 and e2 can be reduced and both edges e1 and e2 can be irradiated at similar luminance. That is, the luminance of both edges is unified. It is desirable that the first angle and the second angle are designed so that both edges are irradiated at similar luminance. For example, the first angle can be in a range of 100° to 150° (including 100°), it is desirable that it is in a range of 120° to 140° and it is preferable that it is approximately 135°. For the second angle, for example, it is in a range of 70° to 100° (not including 100°), it is desirable that it is in a range of 80° to 100° (not including 100°) and it is preferable that it is approximately 90°. The first angle and the second angle can be also designed every groove.

Figure 12A:
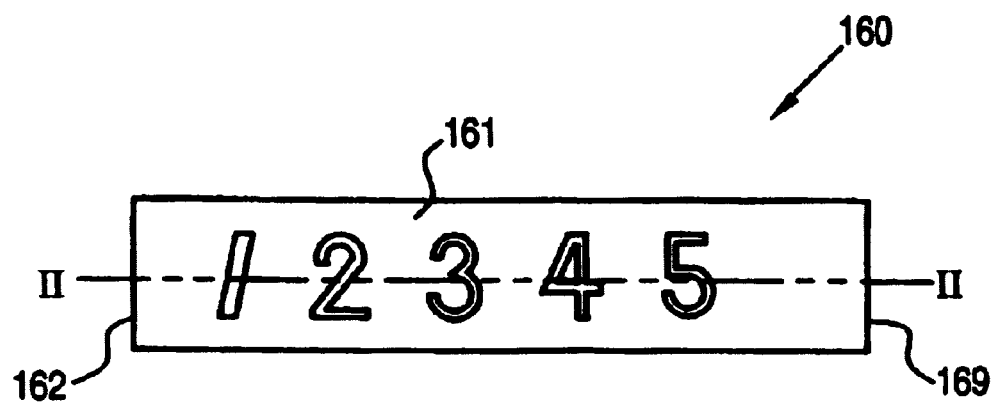
FIGS. 12A and 12B show the second embodiment of a light guide member according to the invention.
Figure 12B:
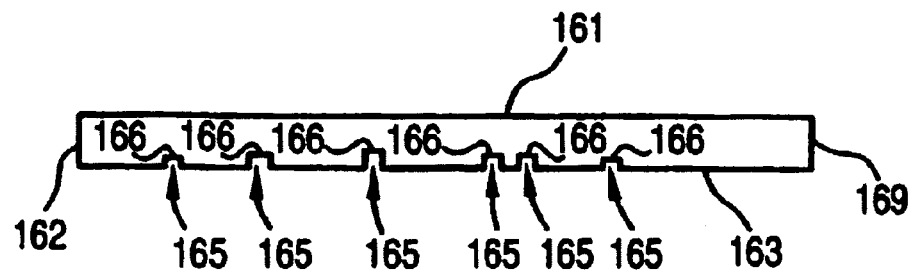

The example of the light guide member to one side of which the light source is opposite, that is, the light guide member one side of which functions as a light incident face is described above, however, the number of the light incident faces is not limited to one and plural light incident faces may be also provided. FIGS. 12A and 12D show an example of a light guide member 160 in case two light incident faces are provided. FIG. 12A is a plan view showing the light guide member 160 and FIG. 12B is a sectional view viewed along a line II—II in FIG. 12A. In assembly, the light source is respectively arranged opposite to the side 162 and the side 169 of the light guide member 160.

Figure 13A:
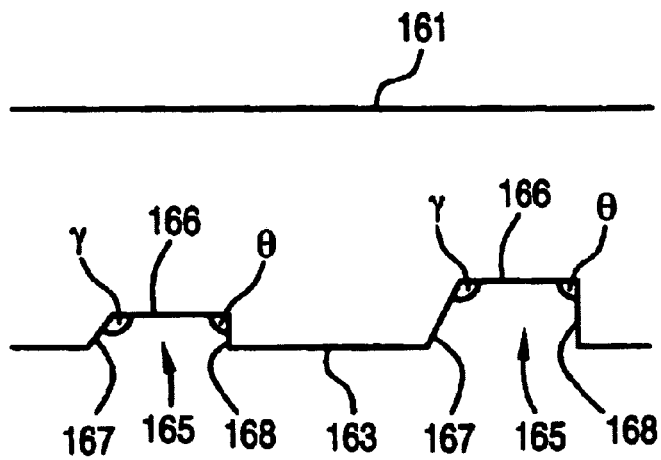
FIGS. 13A through 13D show the second embodiment of a groove formed on the respective backsides of light guide members.
Figure 13B:
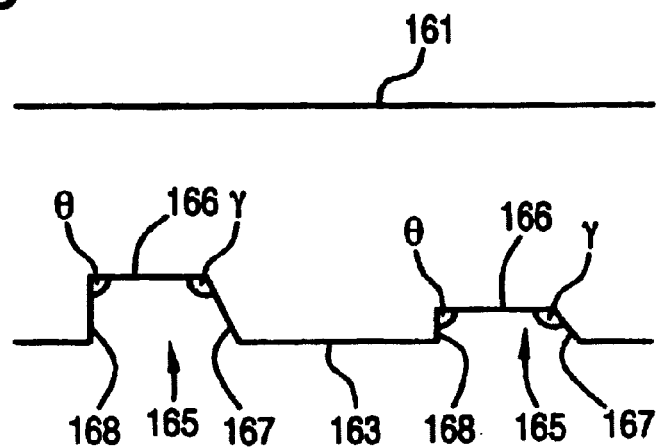
Figure 13C:
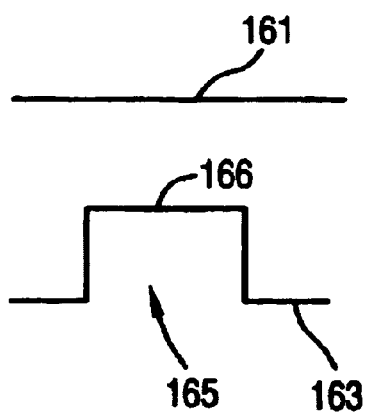
Figure 13D:
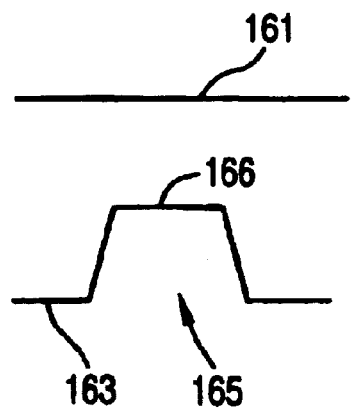

As shown in FIG. 12B, a plurality of grooves 165 each bottom 166 (each display part) of which is located closer to the upper surface 161 as they are formed closer to the center of the light guide member are formed on the backside 163 of the light guide member 160. That is, the bottom 166 (the display part) of the groove 165 formed more distantly from the light source is formed closer to the upper surface 161. In this case, as shown in FIGS. 13A through 13D, an angle between the bottom 166 and the side forming each groove 165 can be also designed as in the case described above. FIG. 13A is an enlarged view showing a part close to the side 162 of the light guide member and FIG. 13B is an enlarged view showing a part close to the side 169 of the light guide member. FIGS. 13C and 13D are enlarged views showing the center of the light guide member. As shown in FIGS. 13A and 13B, an angle γ (a first angle) between the bottom 166 and the side 167 close to the light source can be made larger than an angle θ (a second angle) between the bottom 166 and the side 168 distant from the light source. The groove formed in the center of the light guide member can be formed as shown in FIGS. 13C and 13D. Each range of the first angle and the second angle is similar to that in case the light source is arranged opposite to one side of the light guide member as described above. It is similar to the case described above that a part in which no groove is provided of the backside of the light guide member may be also inclined and the bottom (the display part) of the groove may be also inclined.

Figure 14A:
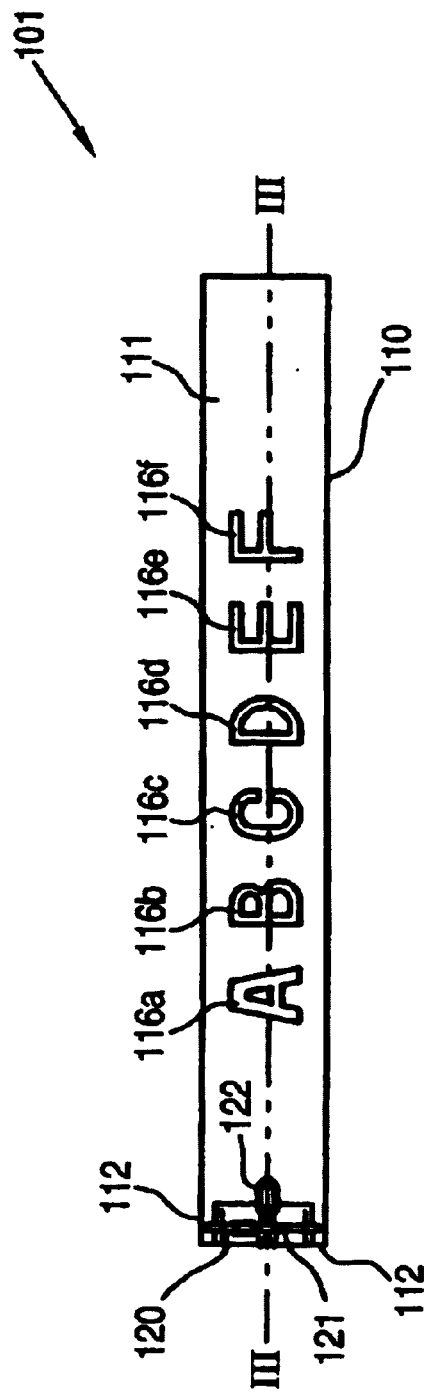
FIGS. 14A and 14B show another scuff plate illumination device of the invention.
Figure 14B:
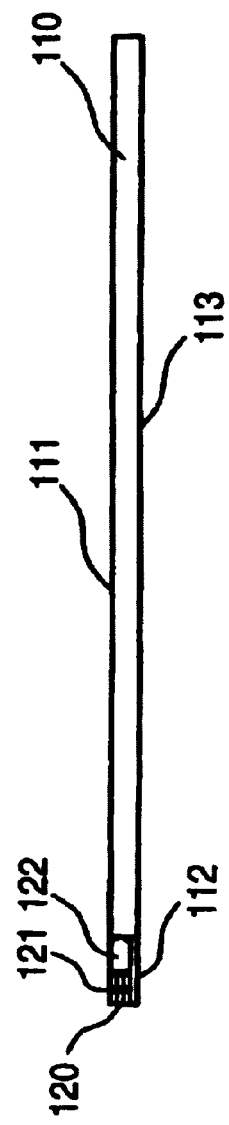
Figure 15:
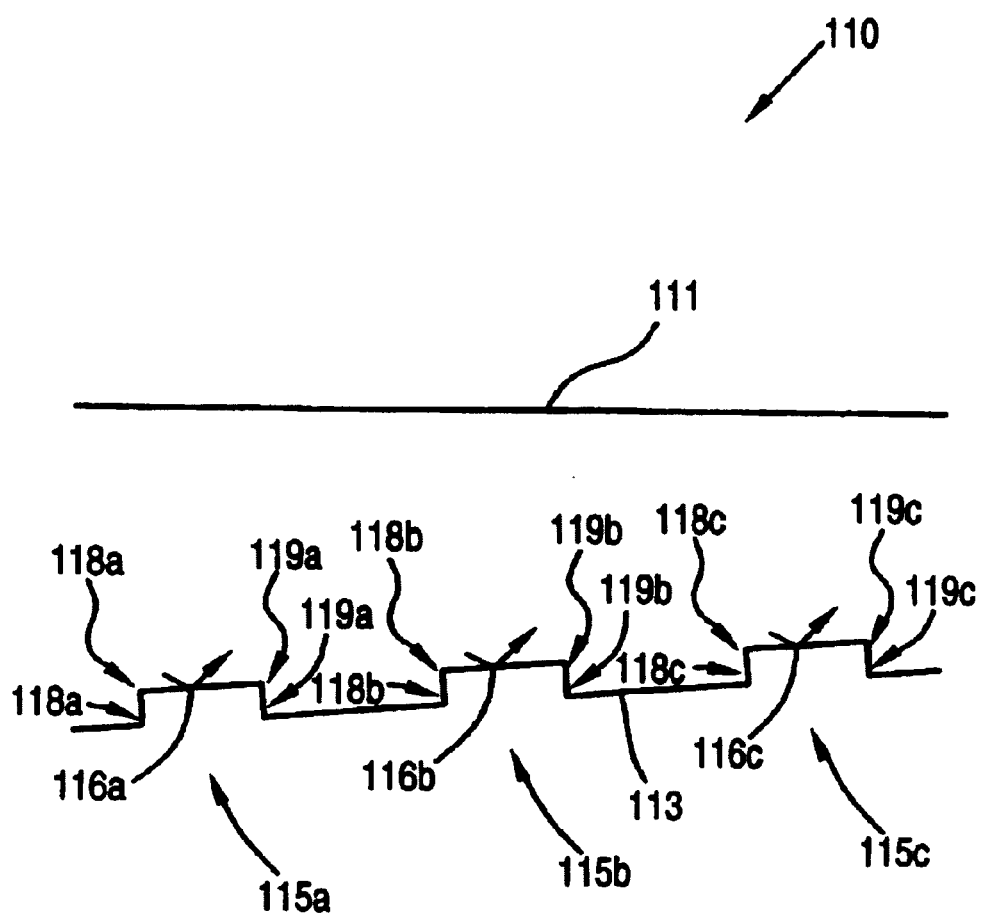
FIG. 15 is an enlarged view showing a part of the scuff plate illumination device in FIGS. 14A and 14B.

FIGS. 14A and 14B show a scuff plate illumination device 101 equivalent to one embodiment of the invention, FIG. 14A is a plan view from the side of an emission observation surface and FIG. 14B is a sectional view viewed along a line III—III in FIG. 14A. FIG. 15 is an enlarged view showing a part of FIG. 14A and a state of grooves formed on the backside 113 of a light guide member 110 is shown.

The scuff plate illumination device 101 is composed of the flat light guide member 110 and a light source unit 120. The light guide member 110 is formed by a plate member made of methacrylic resin. A groove for housing the light source unit 120 is formed at one end 112 of the light guide member 110. The upper surface 111 of the light guide member 110 is a flat surface and the backside 113 is an inclined surface so that it gradually becomes close to the upper surface 111 from the side (hereinafter called the side of the light source) on which the light source unit 120 is housed to the side of the other end. Grooves 115a to 115f which have fixed depth and the bottom (a part of the backside 113 of the light guide member) of which functions as display parts 116a to 116f are formed on the backside 113. Hereby, the more distant from the side of the light source the groove is, the closer to the upper surface 111 the bottom, that is, the display part (116a to 116f) is located (in FIG. 15, for convenience, only the grooves 115a to 115c are shown). In this embodiment, each display part is also inclined like the backside 113 on which no groove is provided.

The light source unit 120 is composed of a circuit board 121, an LED 122 and a device such as a resistor and a capacitor. For the LED 122, an LED that emits amber is used. The light source unit 120 in connected to a power supply control circuit now shown and for example, the lighting of the LED 122 is controlled according to the opening or closing of a door.

Figure 16:
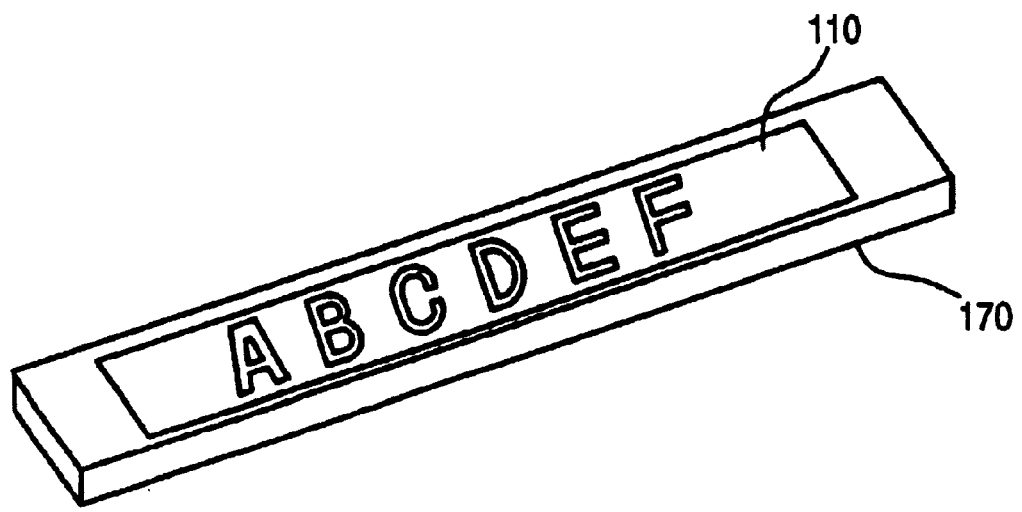
FIG. 16 is a perspective view showing the scuff plate illumination device in FIGS. 14A and 14B covered with a cover.

The scuff plate illumination device 101 can be used in a state in which the part except a part of the upper surface 111 (the emission surface) of the light guide member 110 is covered with a cover 170 made of metal such as a stainless steel SUS as shown in FIG. 16. The scuff plate illumination device 101 can be protected from outside impact by using the cover 170. The emission surface can be prevented from being damaged.

Referring to FIG. 15, a state of emission by the scuff plate illumination device 101 configured as described above will be described below.

light emitted from the LED 122 is incident on the light guide member 110 from the side and after reflection on the backside 113 of the light guide member 110 and the display parts 116a to 116f, the light is radiated from the upper surface 111. When the display part 116a and the display part 116b are noted, first, the display part 116a receives more quantity of light because it is located closer to the LED 122. In the meantime, when positional relation between both display parts and the upper surface 111 of the light guide member is noted, light reflected on the display part 116b reaches the upper surface 111 at shorter distance after reflection and is radiated at higher efficiency because the display part 116b is located closer to the upper surface 111. As described above, the outside radiant efficiency of the display part 116b that receives less light is higher and as a result, difference in luminance between respective light radiated after it is reflected on the respective display parts is reduced. That is, the luminance of the display parts formed close to the LED 122 and the luminance of the display parts formed distantly are unified. Hereby, all the display parts can be displayed at similar luminance. As each display part is inclined from the side close to the LED 122 to the distant side as described above, the unevenness of emission in a part close to the light source and in a part distant from the light source also decreases in each display part, that is, luminance is unified. Further, the part of the backside 113 of the light guide member 110 where the grooves 115a through 115f are not formed is similarly inclined, and the luminance of a part close to the LED 122 and the luminance of a distant part are also unified in the part.

At the edge of each display part, as the convergence and scattering of light occur, the edge is irradiated at high luminance. That is, the periphery of the display part is irradiated at high luminance and is observed. For both edges of each display part (118a and 119a, 118b and 119b, 118c and 119c) and the edges of the different display parts (for example, 118a and 118b), as the edge located more distantly from the LED 122 is located closer to the upper surface 111, the similar effect to the effect of the unification of luminance among the display parts is also produced and the luminance is unified.

A described above, in the scuff plate illumination device 101, the luminance of each display part can be unified and the nonuniformity of emission in each display part is also reduced.

Next, a scuff plate illumination device 102 using a light guide member 130 equivalent to another embodiment will be described. The same reference number is allocated to the same component as that in the scuff plate illumination device 101 and the description is omitted.

Figure 17A:
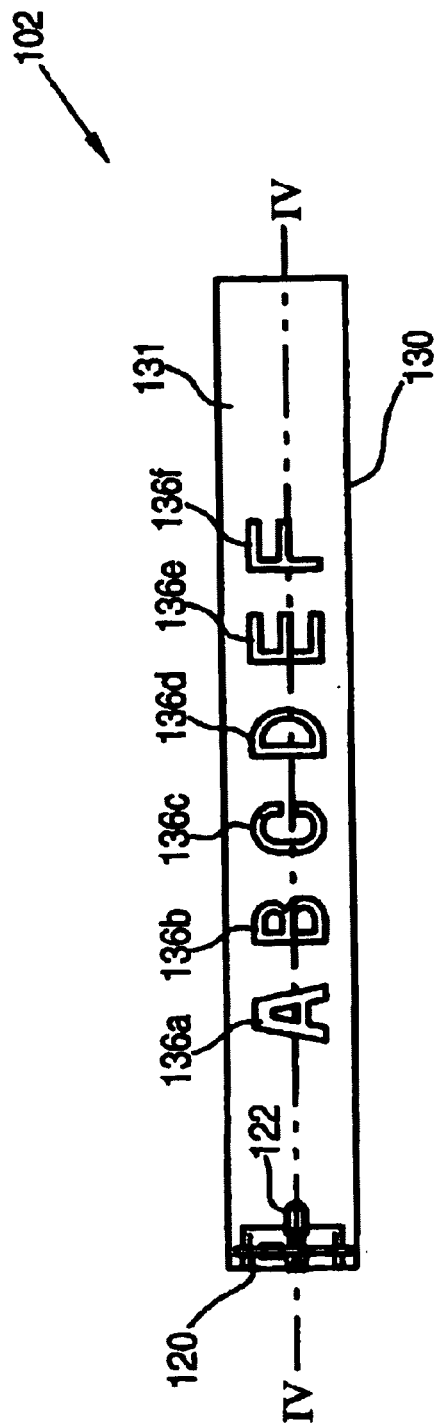
FIGS. 17A and 17B show another scuff plate illumination device of the invention.
Figure 17B:
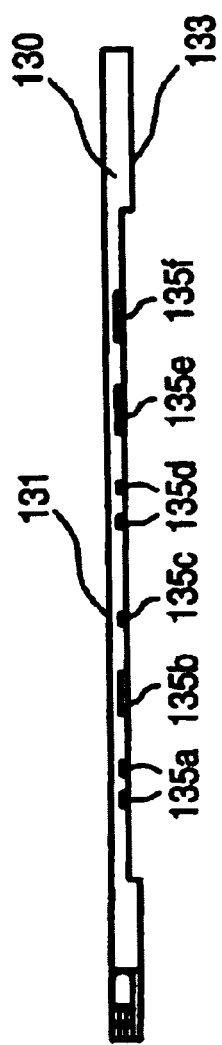
Figure 18:
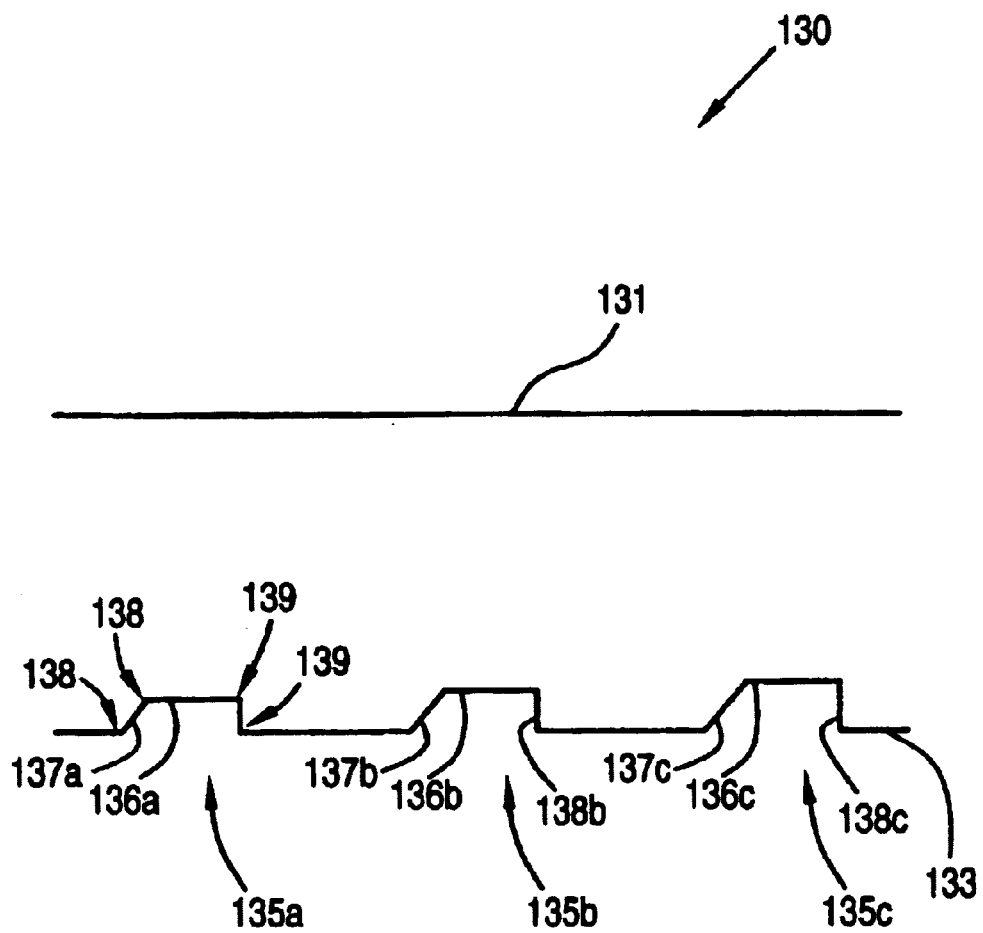
FIG. 18 is an enlarged view showing a part of the scuff plate illumination device in FIGS. 17A and 17B.
Figure 19:
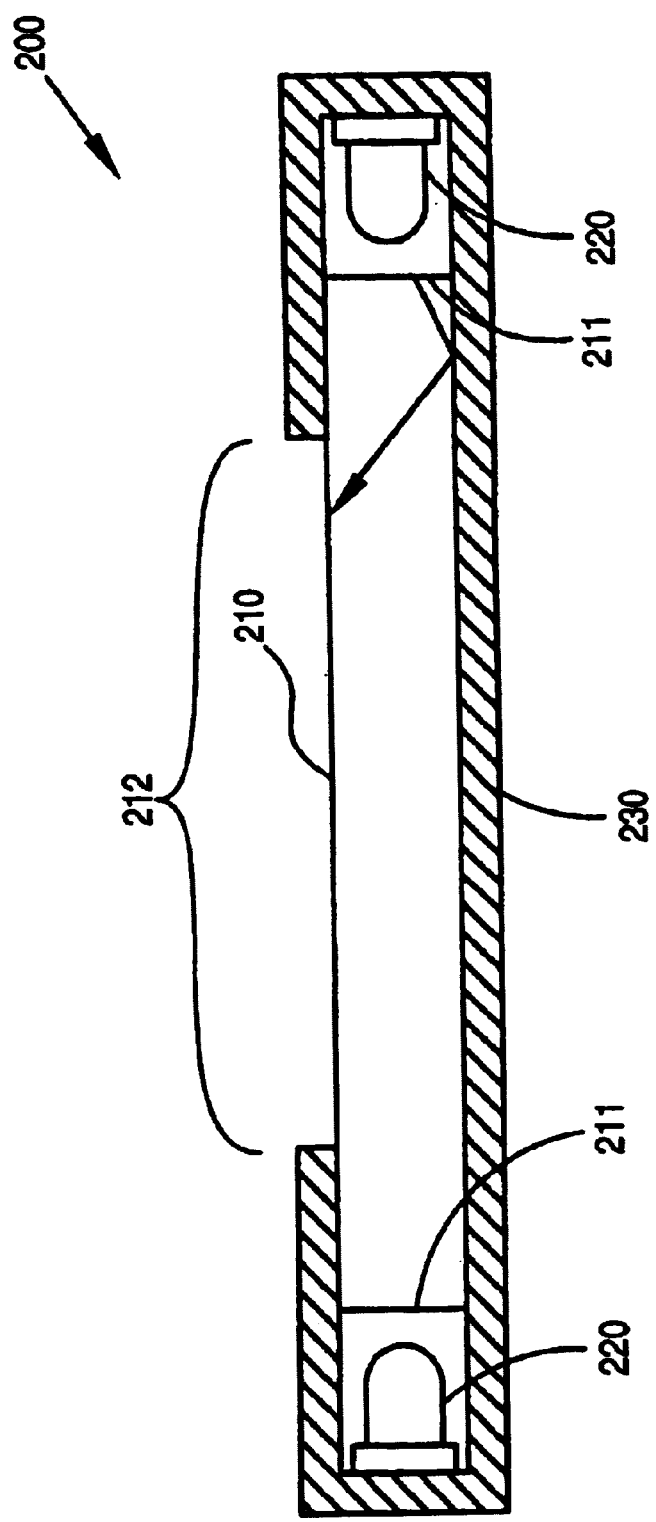
FIG. 19 shows a conventional type scuff plate illumination device.
Figure 20A:
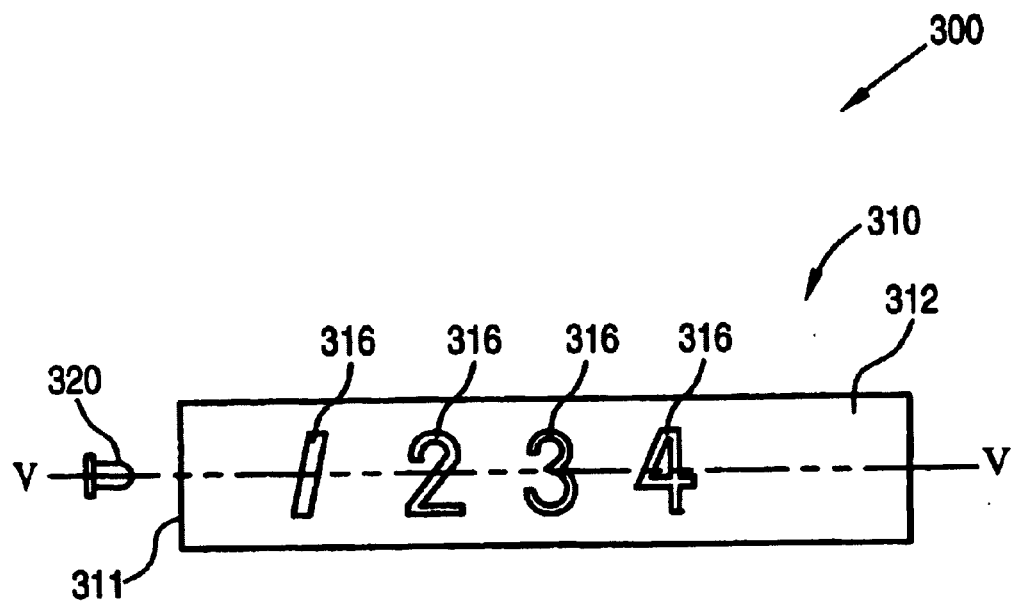
FIGS. 20A and 20B show a scuff plate illumination device having another conventional type configuration.
Figure 20B:
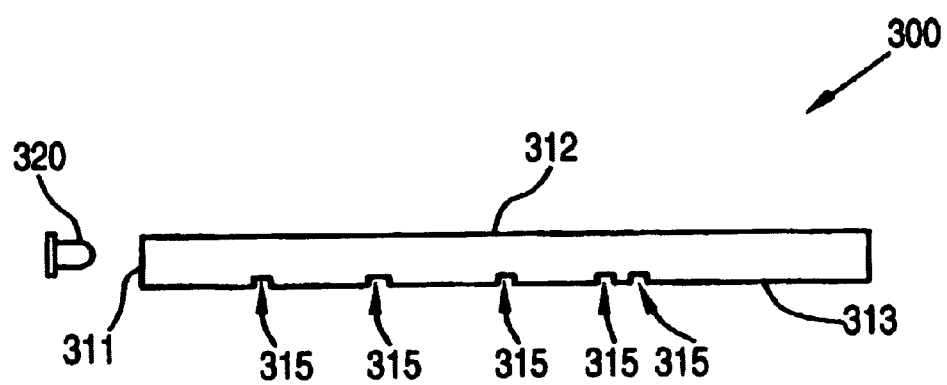

FIGS. 17 and 17B show the scuff plate illumination on device 102, FIG. 17A is a plan view from the side of an emission observation surface and FIG. 17B is a sectional view viewed along a line IV—IV in FIG. 17A. The scuff plate illumination device 102 is composed of the light guide member 130 and a light source unit 120. The light guide member 130 has the same configuration except the shape of the light guide member 110 and the backside of the scuff plate illumination device 101. On the backside 133 of the light guide member 130, a part in which display parts 136a to 136f are formed is recessed on the side of the upper surface 131 and is parallel to the upper surface 131 overall. Grooves 135a to 135f for forming the display parts 136a to 136f are formed on the backside 133. The groove formed more distantly from the LED 122 is made deeper and therefore, as shown in FIG. 18, the display part located more distantly from the LED 122 is located to the upper surface 131. The side on the side (137a or the like) of the LED 122 of each groove is inclined as shown in FIG. 18.

In the scuff plate illumination device 102 provided with such a light guide member 130, first, as the display part located more distantly from the LED 122 is formed in a position closer to the upper surface 131, the luminance of each display part is unified as in the scuff plate illumination device 101 and each display part can be displayed at similar luminance.

Next, a state of emission at the edge of each groove will be described using the groove 135a as an example. First, at the edges 138 and 139 of the groove 135a, emission of high luminance is acquired because of the convergence and scattering of light. Through the side 137a on the side of the LED receives more quantity of light, the scattering of light at the edge is inhibited because the side is inclined and an angle of the edge 138 is gentle. As a result, difference in the quantity of scattered and emitted light between the edges 138 and 139 can be reduced and both edges 138 and 139 can be irradiated at similar luminance. As described above, the luminance at the edge of each display part is unified in the light guide member 130. That is, the periphery of each display part can be irradiated at uniform luminance overall.

In the meantime, as the area of the side of the groove located more distantly from the LED is larger as shown in FIG. 18 though light volume per unit area received by the side of the groove located distantly from the LED decreases, difference between respective total light volume received by the side (for example, 137a) of the groove closer to LED and the side (for example, 137c) of the groove located more distantly from the LED decreases. Hereby, the luminance at the edge of the groove formed close to the LED and the luminance at the edge of the groove formed distantly from the LED are unified and the luminance at the edge of the whole emission surface is unified.

Figure 21A:
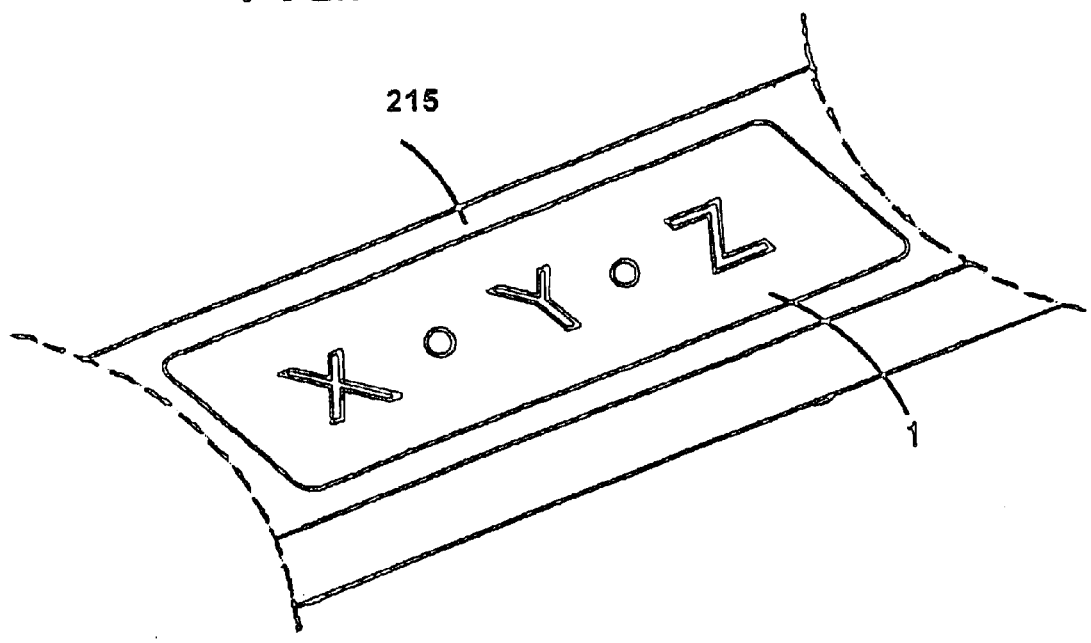
FIGS. 21A, 21B and 21C show a scuff plate illumination device installed on a side step of a vehicle.
Figure 21B:
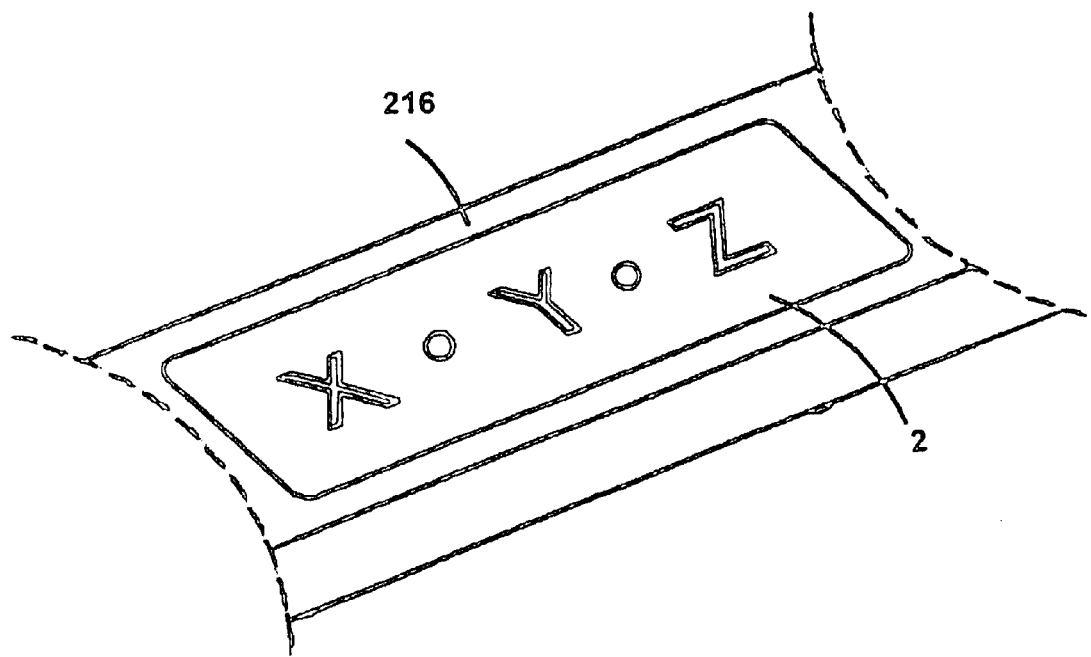
Figure 21:
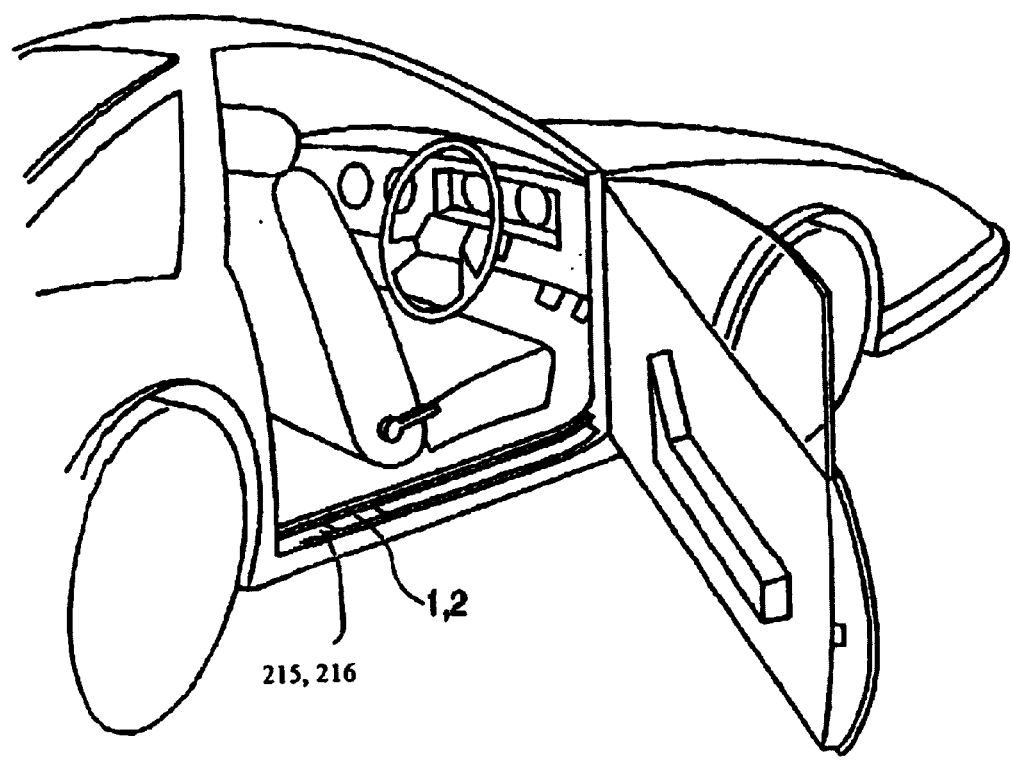

FIG. 21C depicts an illumination device comprising a display plate 1 installed on a side step 215 of an automobile, and an illumination device comprising a scuff plate 2 installed on a side step 216 of a vehicle.

For an example in which the invention is applied, the scuff plate illumination devices 1 and 2 are described above, however, the illumination device according to the invention can be applied to another illumination device for an automobile interior and an illumination device such as a plate illumination device attached to a door and a linear illumination device attached to a pillar. The invention is not limited to an illumination device and an illumination device respectively for an automobile and can be also applied to an illumination device and an illumination device respectively for a display plate in various vehicles, an illumination device and an illumination device respectively for a display plate in the interior of a dwelling or a display plate in the exterior such as a nameplate.

The invention is not limited to the description of the embodiments of the invention. Various transformed embodiments in a range which does not deviate from the description of claims and which can be easily imagined by this manufacturer are also included in the invention.

What is claimed is:

1. An illumination device, comprising:
   a light source;
   a light guide member, which receives a light from the light source on a first surface opposite to the light source and radiates the light to a design surface; and
   a light shield surface formed in the vicinity of the light source and on a recessed portion of a backside surface, opposite the design surface, of the light guide member, which prevents the light from being radiated to the design surface.

2. An illumination device according to claim 1, wherein the light source has an optical axis, the optical axis and the design surface of the light guide member being substantially parallel.

3. An illumination device according to claim 1, wherein a circumferential portion of the design surface is covered with a member for preventing the light from being radiated outward.

4. An illumination device according to claim 1, wherein the light shield surface is formed on a side of the recessed portion.

5. An illumination device according to claim 1, wherein the light guide member includes a groove for housing the light source and wiring.

6. An illumination device according to claim 1, further comprising
   a character plate disposed above the design surface and including a light transmission window; and
   a light transparent sheet disposed above the character plate,
      wherein a circumferential portion of the light transparent sheet is bonded to the light guide member.

7. An illumination device according to claim 6, wherein the light transparent sheet is disposed above a groove for housing the light source.

8. An illumination device according to claim 5, wherein the groove includes a surface through which the light is radiated.

9. An illumination device according to claim 6, wherein
   the light guide member and the light transparent sheet are made of the same material, and
   the light guide member and the light transparent sheet are bonded together.

10. An illumination device according to claim 1, wherein a metal layer is formed on the design surface of the light guide member.

11. An illumination device according to claim 1, wherein a light reflecting layer is formed on the backside of the light guide member.

12. An illumination device according to claim 1, wherein the illumination device comprises a scuff plate installed on a side step of an automobile.

13. An illumination device according to claim 1, wherein the light source comprises an LED.

14. An illumination device according to claim 4, wherein the side forms an angle with a bottom surface of the recessed portion.

15. An illumination device according to claim 14, wherein the angle between the bottom surface of the recessed portion and the side of the recessed portion closest to the light source is larger than a right angle.

16. An illumination device, comprising:
   a light source;
   a light guide member, having a first surface, opposite the light source, the light guide member, including:
      a second surface for emitting light; and
      a backside surface, opposite the second surface, upon which is disposed a plurality of grooves, each of the plurality of grooves including a bottom surface,
         wherein the bottom surfaces of each of the plurality of grooves is disposed closer to the second surface, as distance of each of the plurality of grooves from the light source increases.

17. An illumination device according to claim 16, wherein each of the plurality of grooves includes a first angle between the bottom surface and a first side wall, the first side wall being closer to the light source, and a second angle between the bottom surface and a second side wall, the second side wall being farther from the light source, and the first angle is greater than the second angle.

18. An illumination device according to claim 17, wherein the first angle is not less than 100° and not more than 150°.

19. An illumination device according to claim 16, wherein the second angle is not less than 70° and less than 100°.

20. An illumination device according to claim 16, wherein the backside surface of the light guide member is inclined, such that the backside surface becomes closer to the second surface as distance from the light source increases.

21. An illumination device according to claim 16, wherein each of the bottom surfaces corresponding to each of the plurality of grooves is inclined such that each of the bottom surfaces is closer to the second surface of the light guide member as a distance from the light source increases.

22. An illumination device according to claim 16, wherein each of the bottom surfaces of the plurality of grooves is parallel to the second surface.

23. An illumination device according to claim 16, wherein the light source comprises an LED.

24. An illumination device according to claim 16, wherein the illumination device comprises a display plate installed on a side step of a vehicle.

25. An illuminator device, comprising:

an edge lit light guide member that radiates a first portion of a light to an upper surface of the light guide member; and a light shield, disposed on a recessed portion of a backside surface, opposite the upper surface, of the light guide member that prevents a second portion of the light from being radiated to the upper surface.

26. The illuminator device according to claim 1, further comprising:

one of a step and a groove formed on the backside surface of the light guide member defining the recessed portion in a vicinity of the light source.

27. An illuminator device, comprising:

a light source;

a light guide member, which receives a light from the light source on a first surface opposite to the light source and radiates the lights to a design surface;

one of a step and a groove formed on a backside of the light guide, a recess portion being defined by the step or the groove, in a vicinity of the light source; and a light shield surface formed on the recess portion, which prevents the light from being radiated to the design surface.

* * * * *